United States Patent
Schultz et al.

(10) Patent No.: US 11,679,634 B2
(45) Date of Patent: Jun. 20, 2023

(54) FRONT HEADER TUBE AND PIN BOX

(71) Applicant: Lippert Components, Inc., Elkhart, IN (US)

(72) Inventors: Timothy D. Schultz, Mishawaka, IN (US); Mohammed Taqiuddin, South Bend, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 609 days.

(21) Appl. No.: 16/724,676

(22) Filed: Dec. 23, 2019

(65) Prior Publication Data

US 2020/0198419 A1   Jun. 25, 2020

Related U.S. Application Data

(60) Provisional application No. 62/783,579, filed on Dec. 21, 2018.

(51) Int. Cl.
 *B60D 1/01* (2006.01)
 *B60D 1/48* (2006.01)
 *B62D 21/20* (2006.01)
 *B62D 53/08* (2006.01)

(52) U.S. Cl.
 CPC ............... *B60D 1/01* (2013.01); *B60D 1/48* (2013.01); *B62D 21/20* (2013.01); *B62D 53/0842* (2013.01)

(58) Field of Classification Search
 CPC . B60D 1/01; B60D 1/48; B62D 21/20; B62D 53/0842; B62D 53/08; B62D 53/061
 See application file for complete search history.

(56) References Cited

U.S. PATENT DOCUMENTS

| | | | |
|---|---|---|---|
| 6,023,806 A * | 2/2000 | Dumlao | B63B 5/00 |
| | | | 14/77.1 |
| 6,971,660 B1 | 12/2005 | Putnam | |
| 6,986,524 B2 | 1/2006 | Heitzmann | |
| 7,530,591 B2 | 5/2009 | Mater, Jr. et al. | |
| 7,708,300 B2 | 5/2010 | Paul et al. | |
| 7,712,761 B2 | 5/2010 | Mater, Jr. et al. | |
| 7,775,544 B2 | 8/2010 | Bouwkamp | |
| 7,997,608 B2 | 8/2011 | Mater, Jr. et al. | |
| 8,100,427 B2 | 1/2012 | Mater, Jr. et al. | |
| 8,152,506 B1 * | 4/2012 | Khoshaba | A23P 30/20 |
| | | | 425/126.2 |
| 8,167,329 B2 | 5/2012 | Lee | |
| 8,474,871 B1 * | 7/2013 | Ludwick | B62D 21/09 |
| | | | 280/789 |
| 8,590,917 B2 | 11/2013 | Lee | |
| 8,672,340 B1 | 3/2014 | Hartman et al. | |
| 9,114,680 B2 | 8/2015 | Hartman et al. | |
| 9,446,801 B1 * | 9/2016 | Oren | B62D 53/061 |

(Continued)

*Primary Examiner* — Jacob D Knutson
*Assistant Examiner* — Marlon A Arce
(74) *Attorney, Agent, or Firm* — Nixon & Vanderhye P.C.

(57) ABSTRACT

An upper deck frame assembly for a trailer chassis includes a flushed floor section defining a first floor height, and a header section, with a header, forward of the flushed floor section and defining a second floor height above the first floor height. A towing assembly may be secured to the header. A reduced size header section increases usable floor space, and the towing assembly is securable to the header.

16 Claims, 8 Drawing Sheets

(56) References Cited

U.S. PATENT DOCUMENTS

| | | |
|---|---|---|
| 9,944,137 B2 | 4/2018 | Curl et al. |
| 10,377,195 B2 | 8/2019 | Pulliam et al. |
| 11,221,262 B2* | 1/2022 | Reed ........................ G01G 3/15 |
| 2004/0169348 A1* | 9/2004 | Winckler ........... B62D 53/0835 |
| | | 280/425.2 |
| 2017/0217353 A1* | 8/2017 | Vander Pol .......... B62D 53/061 |

* cited by examiner

FRONT HEADER TUBE AND PIN BOX

CROSS-REFERENCES TO RELATED APPLICATIONS

This application claims the benefit of U.S. Provisional Patent Application No. 62/783,579, filed Dec. 21, 2018, the entire content of which is herein incorporated by reference.

STATEMENT REGARDING FEDERALLY SPONSORED RESEARCH OR DEVELOPMENT (NOT APPLICABLE)

BACKGROUND

The invention relates to an upper deck frame assembly for a towable trailer chassis and, more particularly, to an upper deck frame assembly with a forward header that improves the use of floor space.

The chassis of a towable trailer such as, for example, a "fifth wheel" style towable recreational vehicle (RV), generally has two main components including a pin box and a chassis floor. The pin box serves to connect the king pin of a truck or towing vehicle to the frame of a towable vehicle in a way that mitigates swaying, chucking, and bouncing motions while in transit.

FIG. 1 shows an existing upper deck frame assembly 100. The existing assembly typically includes two headers 102 at the front end or upper deck of the towable trailer. The two headers are mainly used for mounting the side plates of the pin box 104. The portion of the floor between the two headers, however, cannot be used for livable space within the trailer because of a difference in floor height as compared to the "flushed floor" section of the upper deck frame assembly. At best, the area can be used for storage.

BRIEF SUMMARY

It would be desirable to reduce the lengthwise span of the header section to increase the size of the flushed floor section. In the proposed design, there may be only one front header tube, which greatly reduces the lengthwise size of the header portion of the floor. As a result, a significant amount of the previously unusable portion of the floor can be used for livable floor space within the trailer.

The pin box assembly is also improved. The pin box assembly includes wrap-around side plates that mount to the front header tube. The header tube may also be designed to mount a gooseneck hitch or gooseneck towing assembly.

In an exemplary embodiment, an upper deck frame assembly for a trailer chassis includes a flushed floor section defining a first floor height, and a header section forward of the flushed floor section and defining a second floor height above the first floor height, where the header section includes a header. The header section extends less than 10" along a length dimension of the upper deck frame assembly.

The header section may extend 6-8" along the length dimension of the upper deck frame assembly. The header may include a tubular beam. The header may include a single beam. The header may include a plurality of beams.

The assembly may also include a hitch coupling assembly secured to the header. The hitch coupling assembly may be a pin box assembly with a pin box mounting frame, where at least a portion of the pin box mounting frame may be positioned forward of the header section. The pin box mounting frame may include a pair of pin box mounting plates, and the pin box mounting plates may be directly secured to the header. Each of the pin box mounting plates may include a shoulder defining a support surface for the header and a forward extension secured to a front surface of the header. At least one of the pin box mounting plates may include an aft tab positioned aft of the header and including an upper surface that may be level with the flushed floor section.

In another exemplary embodiment, an upper deck frame assembly for a trailer chassis includes a single forward beam extending across at least a portion of a width dimension of the upper deck frame assembly, a flushed floor section connected to and extending aft from the single forward beam, and a hitch coupling assembly secured to the single forward beam.

In yet another exemplary embodiment, an upper deck frame assembly includes a forward beam extending across at least a portion of a width dimension of the upper deck frame assembly, and a flushed floor section coupled with the forward beam, where the flushed floor section is coupled directly with the forward beam.

BRIEF DESCRIPTION OF THE DRAWINGS

These and other aspects and advantages will be described in detail with reference to the accompanying drawings, in which.

DETAILED DESCRIPTION

Figure 2:
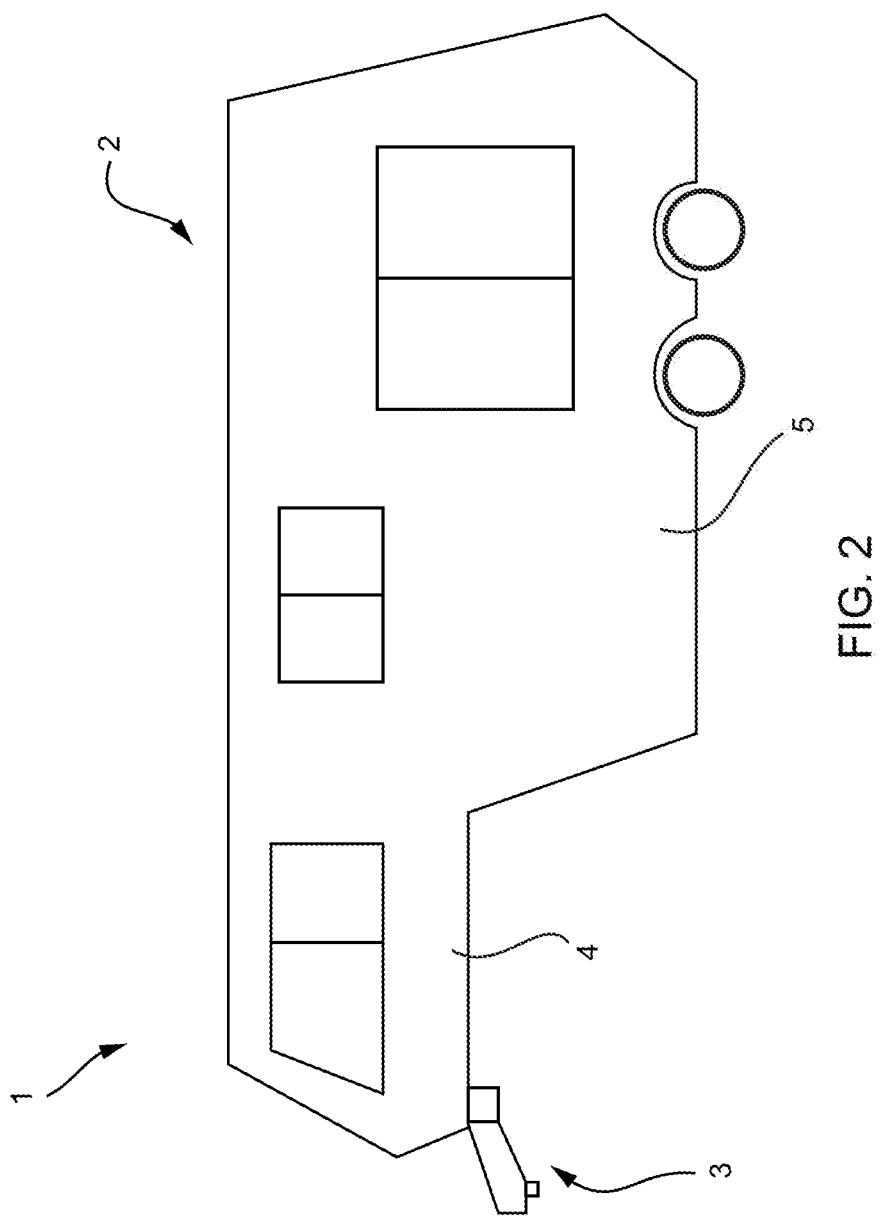
FIG. 2 shows an exemplary trailer incorporating an upper deck frame assembly.

FIG. 2 shows an exemplary towable trailer 1 with a chassis-supported cabin 2 and a pin box 3 secured to the chassis. The cabin 2 includes an upper section 4 supported on an upper deck frame assembly and a main section 5 supported on a lower frame assembly coupled with the upper deck frame assembly. As noted above, floor space in the upper section 4 may be limited by the header connections for securing the pin box 3 to the chassis. It would thus be desirable to minimize the space occupied by the header structure to thereby increase the usable floor space in the upper section 4.

Figure 3:
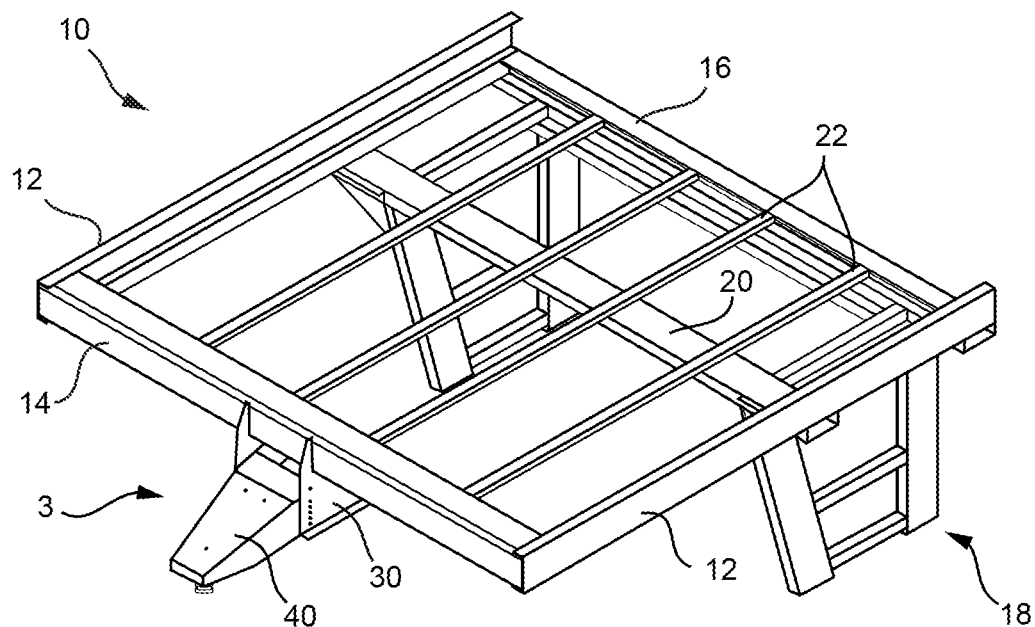
FIG. 3 is a perspective view of the upper deck frame assembly according to the described embodiments.

An exemplary upper deck frame assembly 10 according to the described embodiments is shown in FIG. 3. The frame assembly 10 includes side beams 12 coupled between a forward header 14 and a rear beam 16. A lower frame assembly 18 is connected to the upper deck frame assembly 10 via the side beams 12, the rear beam 16 and an interim beam 20. The connection, construction and functionality of the lower frame assembly 18 are similar to the existing design and thus will not be described in further detail.

Figure 4:
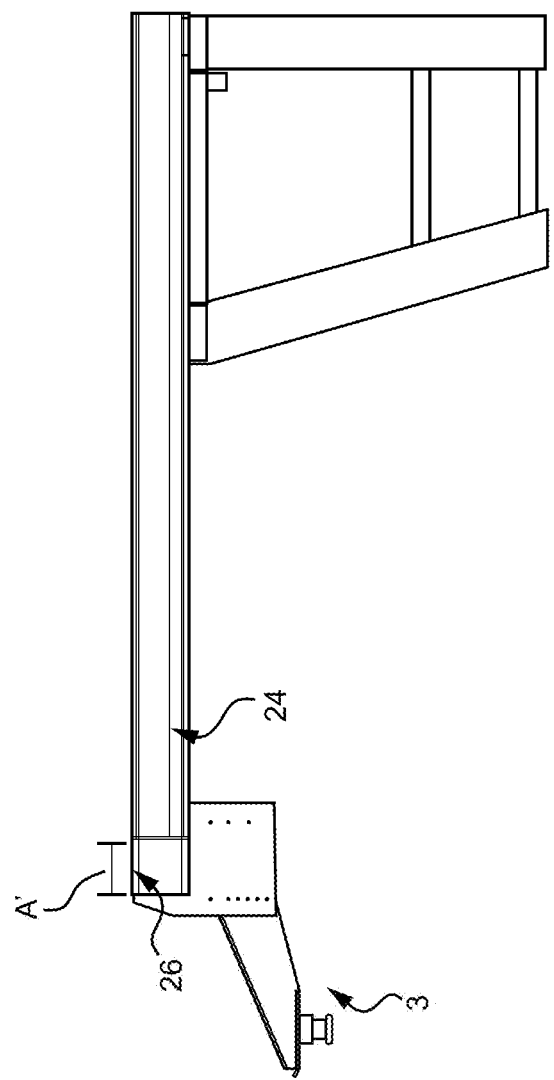
FIG. 4 is a side view of the upper deck frame assembly.

A plurality of sub-beams 22 extend in a lengthwise dimension of the chassis between the header 14 and the rear beam 16. The sub-beams 22 and the rear beam 16 define a flushed floor section with a first floor height 24 (see FIG. 4). The header 14 defines a header section forward of the flushed floor section having a second floor height 26 above the first floor height. The pin box assembly 3 is secured to the header 14.

Figure 1:
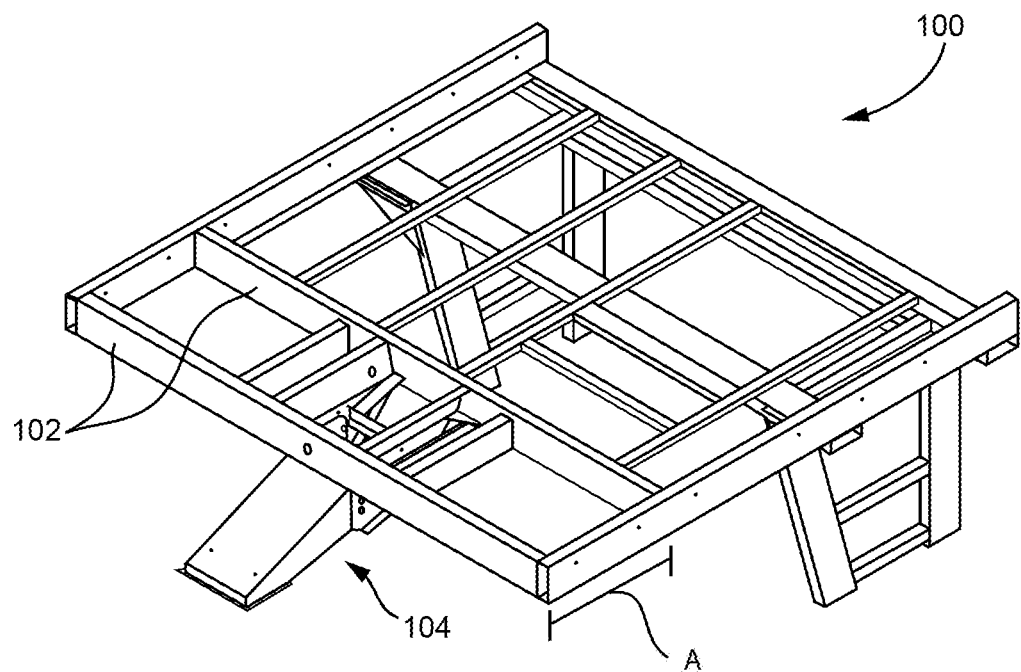
FIG. 1 is a perspective view of an existing upper deck frame assembly for a trailer chassis.

With reference to the existing construction shown in FIG. 1, the headers 102 of the two-header construction span a width of the upper deck frame assembly and span a distance A in the lengthwise dimension. In the existing design, the distance A typically exceeds 24 inches. As such, the header section in the existing design with a raised floor occupies a substantial amount of the upper deck frame assembly lengthwise dimension. With the construction of the described embodiments, in contrast, with reference to FIG. 4, the lengthwise dimension A' of the header section (i.e., along the length dimension of the upper deck frame assembly) may be less than 10 inches, or more preferably 6-8 inches. As such, the higher floor height 26 of the header section with the construction according to the described embodiments can achieve a 75% reduction of occupied space in the length dimension of the upper deck frame assembly.

Figure 8:
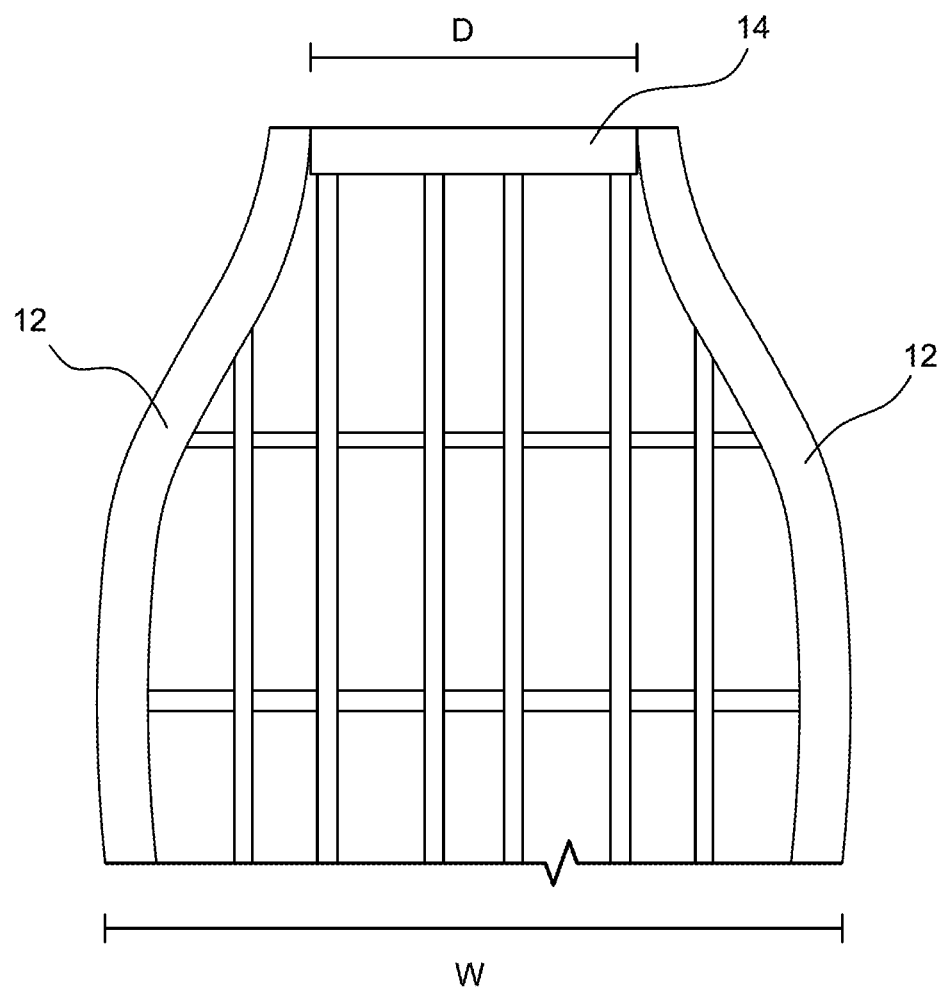
FIG. 8 is a top perspective view of an alternate upper deck frame assembly.

In one construction, the header 14 is a tubular beam. In FIG. 3, the assembly 10 is shown with a single beam 14, but additional beams may be added if necessary for a particular application. In other embodiments, multiple beams may be welded or otherwise coupled to serve as the header 14. The header 14 may extend across at least a portion of a width dimension W of the upper deck frame assembly, which may vary depending on the style or shape of the upper deck frame assembly or the size of the side beams 12. In one embodiment as shown in FIG. 8, the header 14 may extend a substantially shorter distance D than the width dimension of the upper deck frame assembly.

Figure 9:
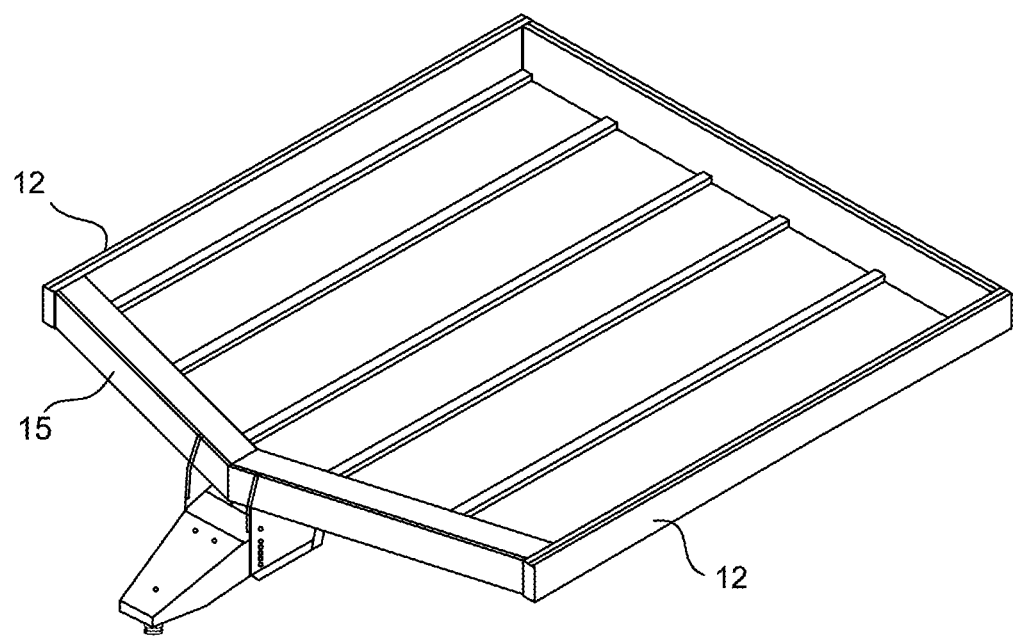
FIG. 9 is a perspective view of another alternate upper deck frame assembly.

In another embodiment shown in FIG. 9, the header tube may be cut, mitered, and welded together to form a V-shaped or pointed header 15. Such an embodiment may be implemented with an upper deck frame assembly with a curved front so that the header tube uses minimal useable floor space of the upper deck.

Figure 5:
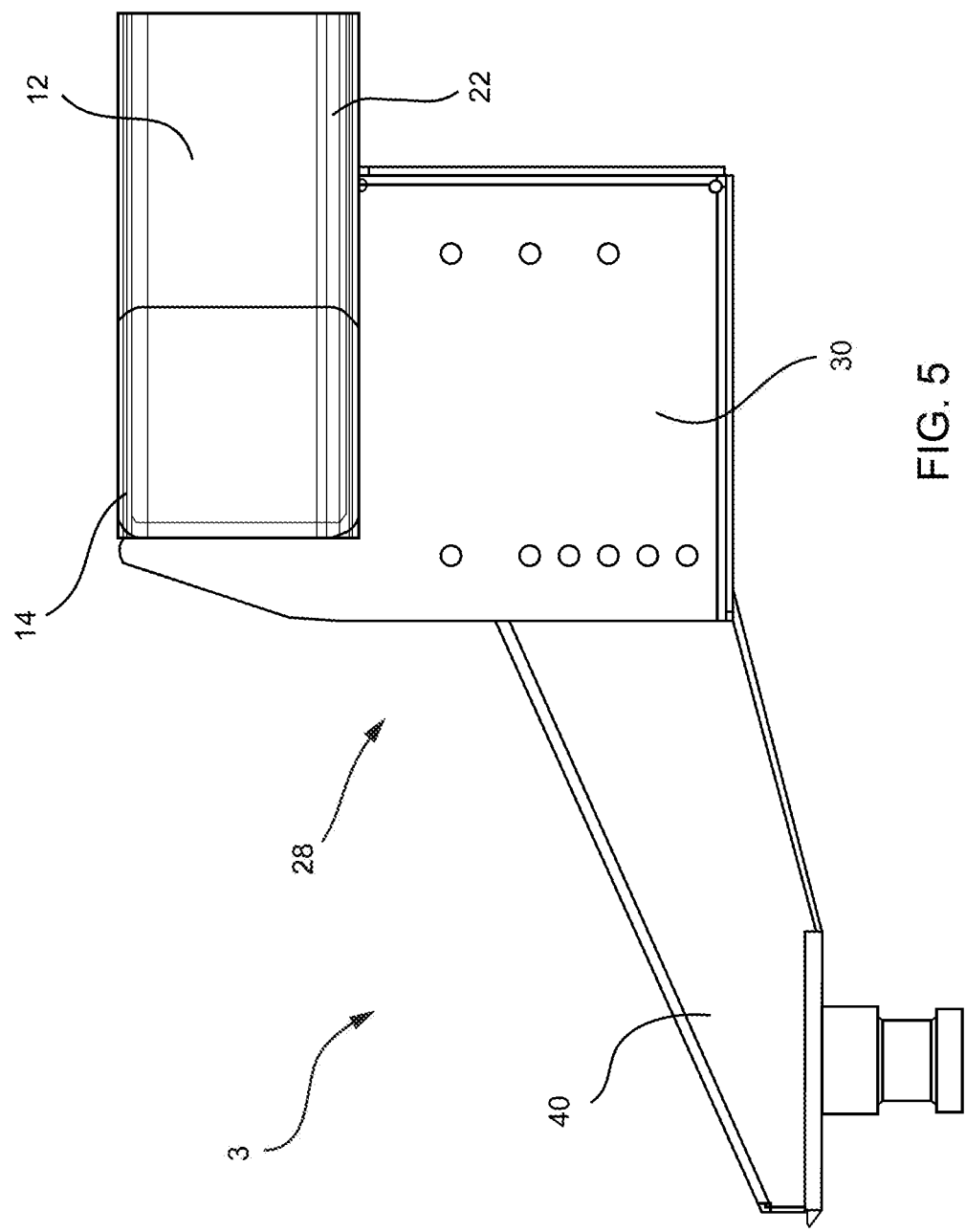
FIG. 5 is a close-up side view of the pin box assembly.
Figure 6:
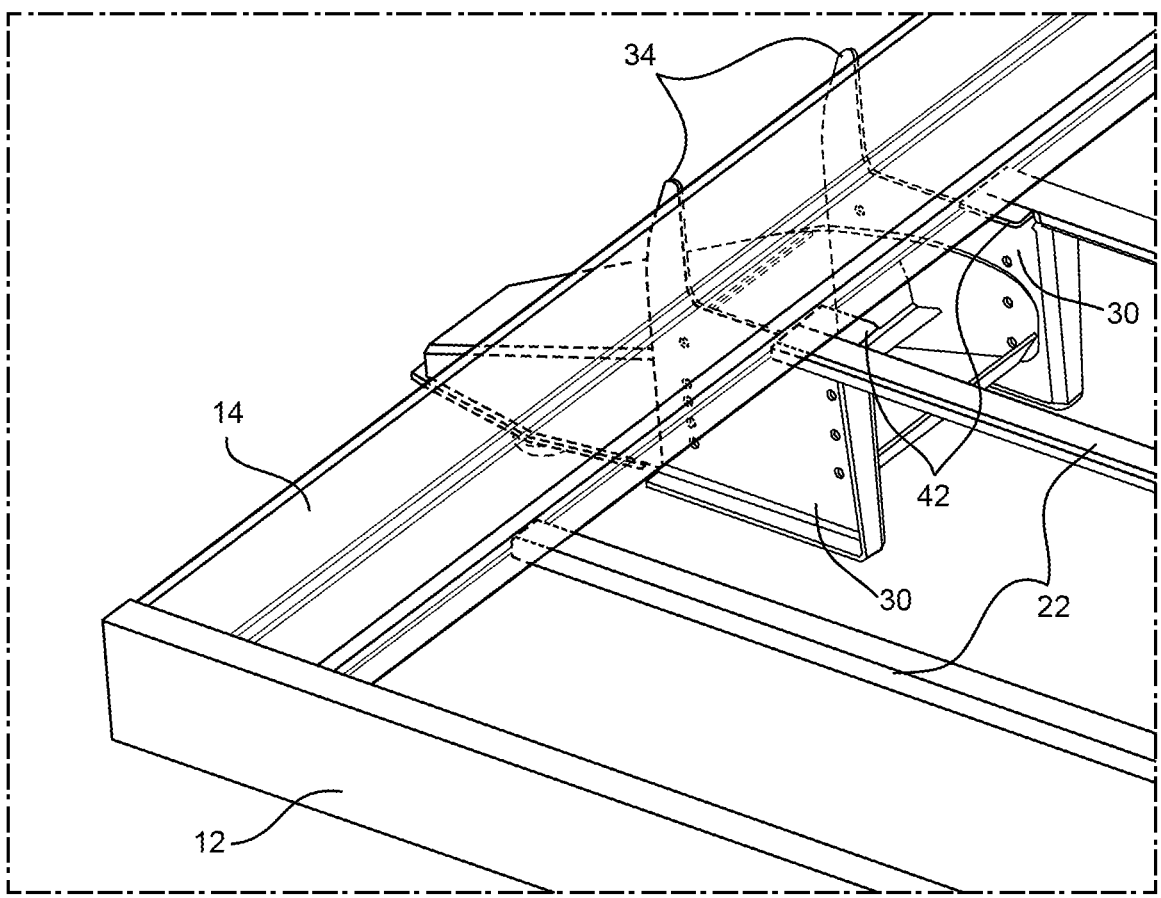
FIG. 6 shows details of the pin box assembly plates secured to the header.
Figure 7:
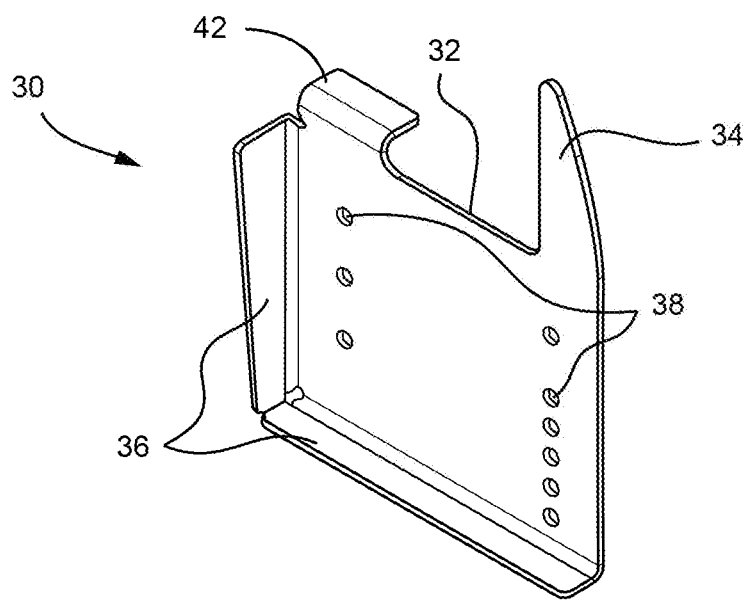
FIG. 7 is a perspective view of an exemplary pin box mounting plate.

With reference to FIGS. 5 and 6, the hitch coupling assembly may be a pin box assembly. A pin box assembly 3 includes a pin box mounting frame 28. As shown, at least a portion of the pin box mounting frame 28 may be positioned forward of the header 14 or header section. The pin box mounting frame 28 is defined by a pair of pin box mounting plates 30 that may be secured directly to the header 14 by welding or the like. A detailed view of one of the pin box mounting plates 30 is shown in FIG. 7. Each of the pin box mounting plates 30 includes a shoulder 32 defining a support surface for the header 14 and a forward extension 34 that is securable to a front surface of the header 14. Mounting plates 30 may be angled or non-parallel to accommodate the pin box shape. Bent sections 36 may be provided for added structural integrity and stiffness, and holes 38 are provided for mounting a kingpin housing 40 (see FIGS. 3 and 5). In some embodiments, at least one of the pin box mounting plates 30 may also be provided with an aft tab 42 positioned aft of the header 14 and including an upper surface that is level with the flushed floor section (i.e., at the first floor height 24). In other embodiments, the mounting plates 30 may form a singular U-shaped mounting plate (not shown) that cradles the pin box underneath the header tube.

Figure 10:
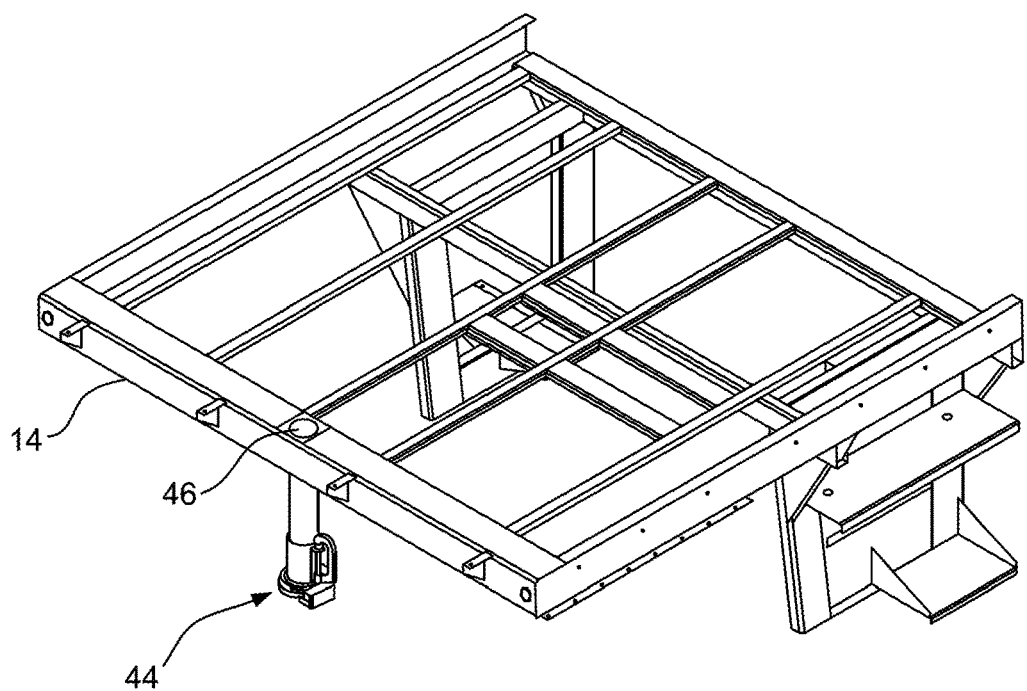
FIG. 10 is a perspective view of an embodiment of an upper deck frame assembly securing a gooseneck hitch assembly.
Figures 11, 12:
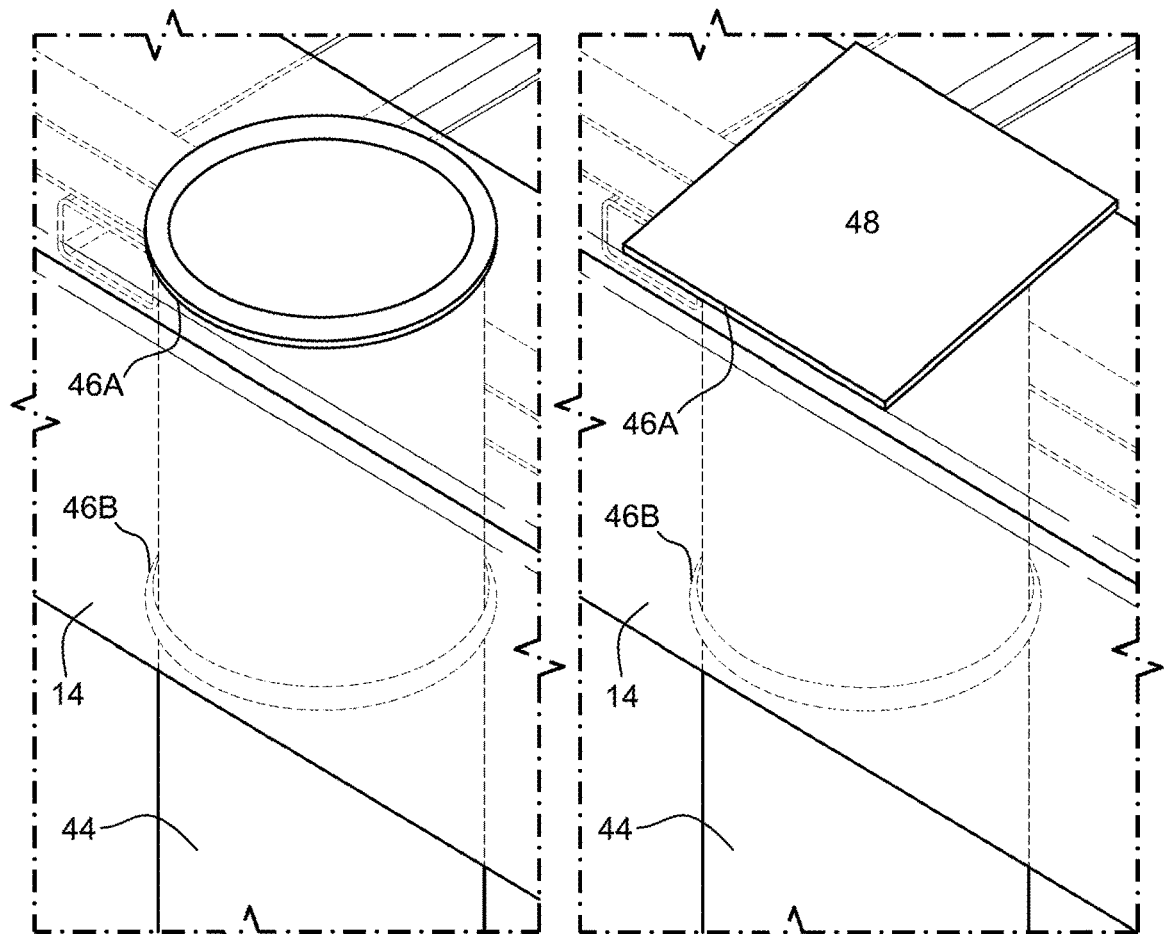
FIG. 11 is a close-up partial phantom view of the gooseneck hitch assembly secured to the header.
FIG. 12 is the gooseneck hitch assembly and header of FIG. 11 shown with a cover plate.

As seen in FIGS. 10-12, the hitch coupling assembly could alternatively be a gooseneck hitch assembly. A gooseneck hitch assembly 44 may be mounted directly to the header 14 when at least one aperture 46 is cut into the top and bottom surfaces of the tubular header. The at least one aperture 46 may be made by laser cut, punch press, or any other suitable manner. A trailer-mounting end or upper end of the gooseneck assembly 44 may be inserted into the at least one aperture 46 and welded into connection with the header 14 about the edge of the at least one aperture 46. The gooseneck hitch assembly may be welded to the header at one or both of the apertures of the top surface 46A and bottom surface 46B of the header 14. A cover plate 48 may optionally be welded to the top surface aperture 46A for reinforcement and protection of the gooseneck assembly. The gooseneck hitch assembly may be secured to the header in any other known manner in other embodiments.

In addition to the added usable floor space, the described assembly utilizes significantly fewer pieces than the existing design. That is, the construction of the described embodiments no longer needs support tubes that run between the front and rear headers, and the pin box gussets can be eliminated. An added benefit is the reduction in total weight of the assembly. Even though it is contemplated that the header of the described embodiments would be made from a thicker wall tube than the existing individual header tubes, the total weight of the assembly is considerably less. Still further, the heavier tube of the header is closer in thickness to the pin box mounting plates, thereby facilitating the welding process. Loading from the pin box mounting plates to the header is also improved as the load is distributed through all of the welds along the front, bottom and back of the header, thereby reducing stress levels on the header. In the existing design, there are some areas that are loaded in tension with other areas loaded in compression, which is disadvantageous. The described construction reduces the likelihood that there would ever be a structural failure, even if overloaded or used beyond its intended lifecycle.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An upper deck frame assembly for a trailer chassis comprising:
   a flushed floor section defining a first floor height;
   a header section forward of the flushed floor section and defining a second floor height above the first floor height, the header section including a header, wherein a difference between the second floor height and the first floor height is equal to or less than a height of the header,
   wherein the header section extends less than 10" along a length dimension of the upper deck frame assembly; and
   a pin box assembly secured to the header, the pin box assembly comprising a pin box mounting frame including a pair of pin box mounting plates each having a shoulder defining a support surface for the header and a forward extension secured to a front surface of the header.

2. An upper deck frame assembly according to claim 1, wherein the header section extends 6-8" along the length dimension of the upper deck frame assembly.

3. An upper deck frame assembly according to claim 1, wherein the header comprises a tubular beam.

4. An upper deck frame assembly according to claim 1, wherein the header comprises a single beam.

5. An upper deck frame assembly according to claim 1, wherein the header comprises a plurality of beams.

6. An upper deck frame assembly according to claim 1, wherein at least a portion of the pin box mounting frame is positioned forward of the header section.

7. An upper deck frame assembly according to claim 1, wherein the pin box mounting plates are directly secured to the header.

8. An upper deck frame assembly according to claim 1, wherein at least one of the pin box mounting plates comprises an aft tab positioned aft of the header and including an upper surface that is level with the flushed floor section.

9. An upper deck frame assembly for a trailer chassis comprising:
  a single forward beam extending across at least a portion of a width dimension of the upper deck frame assembly;
  a flushed floor section connected to and extending aft from the single forward beam; and
  a hitch coupling assembly secured to the single forward beam,
  wherein the hitch coupling assembly is a pin box assembly, and wherein the pin box assembly is secured to at least a bottom side and a forward side of the single forward beam, the pin box assembly comprising a pin box mounting frame including a pair of pin box mounting plates each having a shoulder defining a support surface for the single forward beam and a forward extension secured to a front surface of the single forward beam.

10. An upper deck frame assembly according to claim 9, wherein the flushed floor section defines a first floor height, and wherein the single forward beam defines a second floor height above the first floor height.

11. An upper deck frame assembly according to claim 10, wherein the single forward beam extends less than 10" along a length dimension of the upper deck frame assembly.

12. An upper deck frame assembly according to claim 10, wherein the hitch coupling assembly is one of a pin box assembly and a gooseneck towing assembly.

13. An upper deck frame assembly according to claim 9, wherein the pin box mounting plates are directly secured to the single forward beam.

14. An upper deck frame assembly comprising:
  a forward beam extending across at least a portion of a width dimension of the upper deck frame assembly;
  a flushed floor section coupled with the forward beam, wherein the flushed floor section is coupled directly with the forward beam; and
  a hitch coupling assembly secured to the forward beam, the hitch coupling assembly being a pin box assembly, wherein the hitch coupling assembly is secured to a bottom side and a forward side of the forward beam or is secured vertically through the forward beam,
  the pin box assembly comprising a pin box mounting frame including a pair of pin box mounting plates each having a shoulder defining a support surface for the forward beam and a forward extension secured to a front surface of the forward beam.

15. An upper deck frame assembly according to claim 14, wherein at least a portion of the pin box mounting frame is positioned forward of the forward beam.

16. An upper deck frame assembly according to claim 15, wherein the pin box mounting plates are directly secured to the forward beam.

* * * * *